(12) United States Patent
Tsai et al.

(10) Patent No.: US 8,371,813 B2
(45) Date of Patent: Feb. 12, 2013

(54) BLADE PITCH CONTROLLING APPARATUS AND APPLICATION THEREOF

(75) Inventors: Yifeng Tsai, Fongshan (TW); Feibin Hsiao, Tainan (TW)

(73) Assignees: National Cheng Kung University, Tainan (TW); Digisine Energytech Co., Ltd., Hsin-Tien (TW)

( * ) Notice: Subject to any disclaimer, the term of this patent is extended or adjusted under 35 U.S.C. 154(b) by 798 days.

(21) Appl. No.: 12/574,712

(22) Filed: Oct. 7, 2009

(65) Prior Publication Data

US 2010/0129220 A1 May 27, 2010

(30) Foreign Application Priority Data

Nov. 25, 2008 (TW) ................................ 97145552 A

(51) Int. Cl.
*B63H 3/02* (2006.01)

(52) U.S. Cl. .......................................... 416/50; 416/151

(58) Field of Classification Search .................... 416/31, 416/41, 44, 45, 46, 50–52, 151, 159; 415/4.1, 415/4.3, 4.5, 25, 30, 33, 48
See application file for complete search history.

(56) References Cited

U.S. PATENT DOCUMENTS

| 4,257,740 | A | * | 3/1981 | Duez | 416/137 |
| 5,599,168 | A | * | 2/1997 | Lund | 416/136 |
| 7,172,392 | B2 | * | 2/2007 | Wastling et al. | 416/43 |
| 7,186,083 | B2 | * | 3/2007 | Bayly | 416/51 |

* cited by examiner

*Primary Examiner* — Edward Look
*Assistant Examiner* — William Grigos
(74) *Attorney, Agent, or Firm* — Leong C. Lei

(57) ABSTRACT

A blade pitch controlling apparatus and an application thereof are described. The blade pitch controlling apparatus includes a centrifugal device and a blade pitch variable device, and the blade pitch variable device is arranged under the centrifugal device. The blade pitch variable device has a downward stroke that is variable by the centrifugal device according to a centrifugal force induced thereon so as to drive the blade pitch variable device to change the setting angle of the blades of the wind power generator.

16 Claims, 12 Drawing Sheets

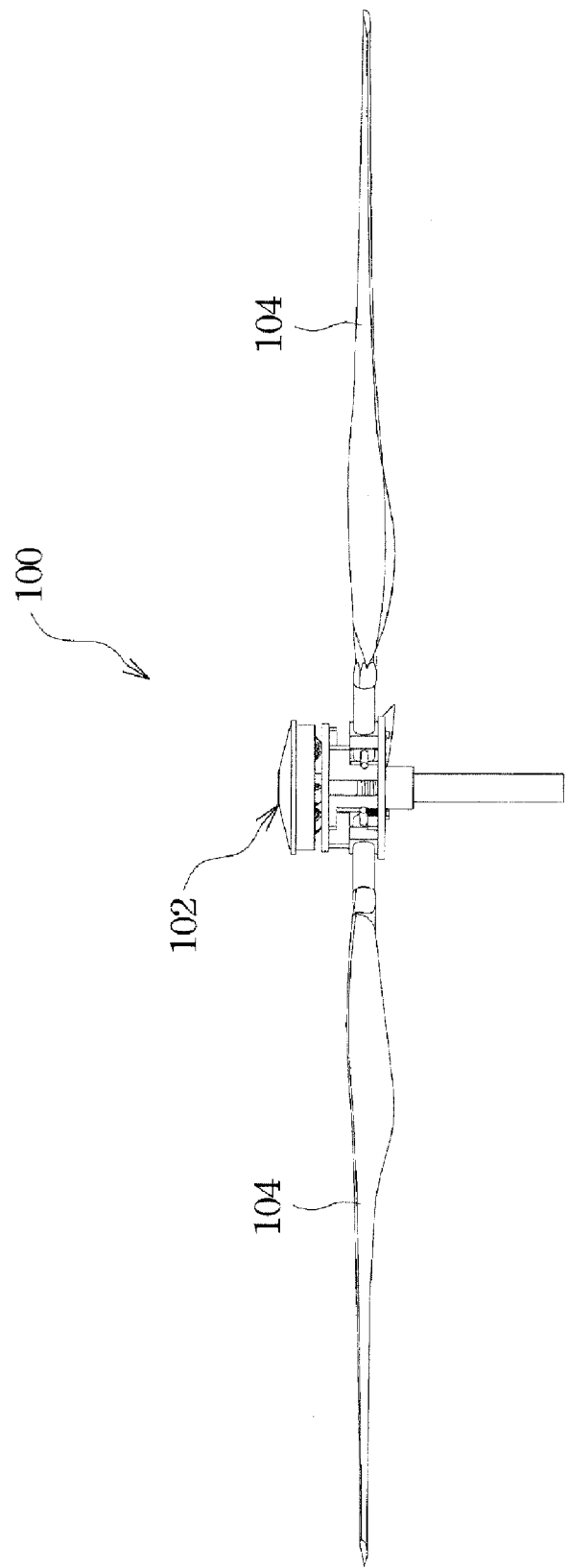

BLADE PITCH CONTROLLING APPARATUS AND APPLICATION THEREOF

(a) TECHNICAL FIELD OF THE INVENTION

The present invention generally relates to a control apparatus of a power generator, and more particularly to a blade pitch controlling apparatus and an application thereof to a wind power generator.

(b) DESCRIPTION OF THE PRIOR ART

The exhaustion of the resources of the Earth and the development of technology lead to shortage of energy. Due to such a problem every country in the world is attempting the develop substitute energies, such as solar energy and wind power generation. Among all the substitute energies that are currently available, wind power is a clean and environmentally protective substitute energy.

Generally, a wind power generator uses wind power to drive the rotation of blades, of which the rotational speed might be increased through a speed increasing mechanism for eventually driving a dynamo. In other words, the wind power generation converts wind power into mechanical energy, which is then converted into electrical power. Power accumulators or batteries are then used to store the electrical power. Currently, the blades of the wind power generator adopt an airfoil configuration in order to enhance the use of wind power.

In the practical operation of a wind power generator, the operation starts from an initial, non-steady-state acceleration phase and then enters a steady-state power generation phase, and optionally enters an over-speed protection phase when the wind speed becomes excessive. Since the aerodynamic design of the blades only allow for optimization of the input conditions including wind speed and rotational speed, during the operation of the wind power generator, significant challenges that a wind power generator might face are the non-steady-state acceleration phase before it reaches the steady state operation and the protection phase when it takes an over-critical load.

Currently, a large-sized wind power generator comprises a servo mechanism and a computer that are concealed inside a hub to control the setting angle of the blades in order to shorten a non-steady-state acceleration phase and to realize fine adjustment of the setting angle of the blades in a steady-state power generation phase so as to allow the blades to obtain the maximum lift force before stalling Further, in case of excessive wind speed, the setting angle of the blades can be adjusted to intentionally make the blades stalling in order to protect the wind power generator from damage caused by the excessive wind speed.

Due to the concerns of volume, weight, economic value, and cost, a small-sized wind power generator is not suitable for such a servo mechanism. However, the small-sized wind power generator still faces the same problem of non-steady-state acceleration and over-speed protection during the operation thereof.

SUMMARY OF THE INVENTION

An objective of the present invention is to provide a blade pitch controlling apparatus and a wind power generator to which the blade pitch controlling apparatus is applied. The blade pitch controlling apparatus comprises a centrifugal device that varies a downward stroke of a blade pitch variable device according to a centrifugal force induced therein to change the setting angle of the blades of the wind power generator, so as to provide the optimum windward attack angle of the blades in the starting acceleration phase, to maintain the operation of steady state rotation of the blades at the attack angle that provides the maximum windward lift force, and to stall the blades in an over-speed condition for reducing the thrust force of the blades.

According to the above objective of the present invention, the present invention provides a blade pitch controlling apparatus, which comprises: a centrifugal device; and a blade pitch variable device, which comprises: a control disk, which comprises a plurality of lifting elements and a plurality of constraining elements alternating each other; a setting disk, which is arranged under the control disk, the setting disk comprising a plurality of setting sections to respectively receive a plurality of blade shafts, each setting section being arranged between adjacent lifting element and constraining element, the setting disk forming a plurality of through holes for respectively receiving extension of the lifting elements and the constraining elements in a movable manner, each of the blade shafts comprising a pin having opposite first and second ends; a first spring, which is arranged between the control disk and the setting disk, the centrifugal device and the first spring being respectively positioned against opposite surfaces of the control disk; a plurality of second springs, each of which has a first end coupled to the setting disk and a second end coupled to the first end of each of the pins; and a plurality of adjustment elements, each of which is set below and in contact engagement with the first end of each of the pins, whereby when the control disk is raised to a first predetermined height, the lifting elements respectively raise the first ends of the pins, and when the control disk is lowered down to a second predetermined height, the constraining elements respectively depress downward the second ends of the pins.

In accordance with a preferred embodiment of the present invention, the centrifugal device comprises: a centrifugal disk, which defines a plurality of tracks; and a plurality of rollers, which are respectively and movably received in the tracks, whereby the roller are movable along the respective tracks.

According to the objective of the present invention, the present invention provides a wind power generator comprising: a plurality of blades and a blade pitch controlling apparatus. Each blades comprises a shaft, and each shaft comprises a pin that has opposite first and second ends. The blade pitch controlling apparatus comprises a centrifugal device and a blade pitch variable device. The blade pitch variable device comprises: a control disk, which comprises a plurality of lifting elements and a plurality of constraining elements alternating each other; a setting disk, which is arranged under the control disk, the setting disk comprising a plurality of setting sections, the shafts being respectively and rotatably received in the setting sections, each setting section being arranged between adjacent lifting element and constraining element, the setting disk forming a plurality of through holes for respectively receiving extension of the lifting elements and the constraining elements in a movable manner; a first spring, which is arranged between the control disk and the setting disk, the centrifugal device and the first spring being respectively positioned against opposite surfaces of the control disk; a plurality of second springs, each of which has a first end coupled to the setting disk and a second end coupled to the first end of each of the pins; and a plurality of adjustment elements, each of which is set below and in contact engagement with the first end of each of the pins, whereby when the control disk is raised to a first predetermined height, the lifting elements respectively raise the first ends of the pins, and when the control disk is lowered down to a second predetermined height, the constraining elements respectively depress downward the second ends of the pins In accordance with a preferred embodiment of the present invention, each adjustment element comprises a threaded bar. Each lifting element comprises a C-shape, which receives the first end of the respective pin therein. And, each constraining element comprises an inverted L-shape.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1B is a side elevational view of the embodiment of the present invention.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention provides a blade pitch controlling apparatus and an application thereof in a wind power generator for varying the setting angle of blades of the wind power generator in the operation thereof so as to maintain the optimum windward attack angle of the blades in the course of acceleration, maintain the operation of steady state rotation of the blades at the attack angle that provides the maximum windward lift force, and to stall the blades in an over-speed condition for reducing the thrust force of the blades. A more detailed description of the present invention will be given with reference to FIGS. 1A-8C.

Figure 1A:
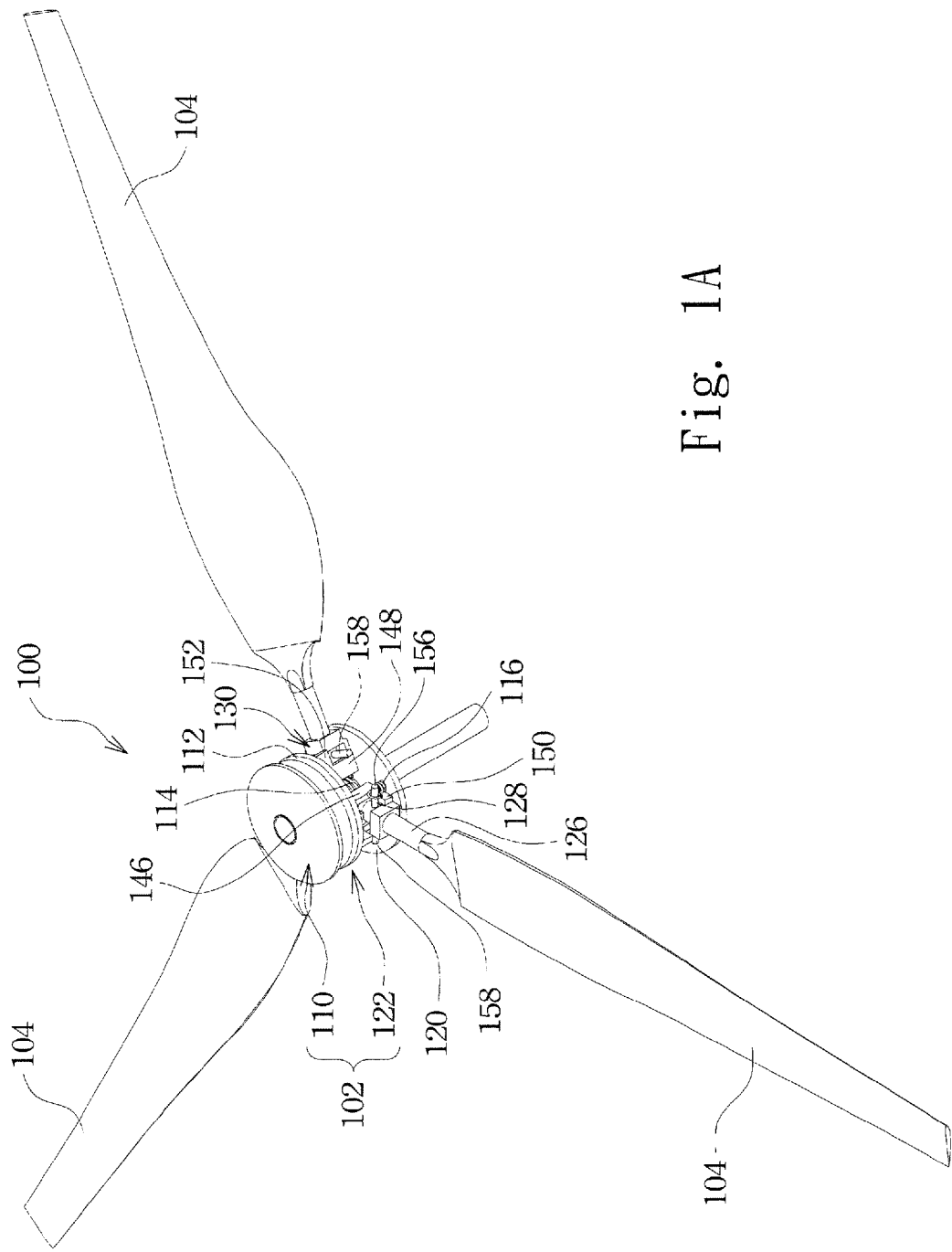
FIG. 1A is a perspective view of an embodiment of the present invention.
Figure 1C:
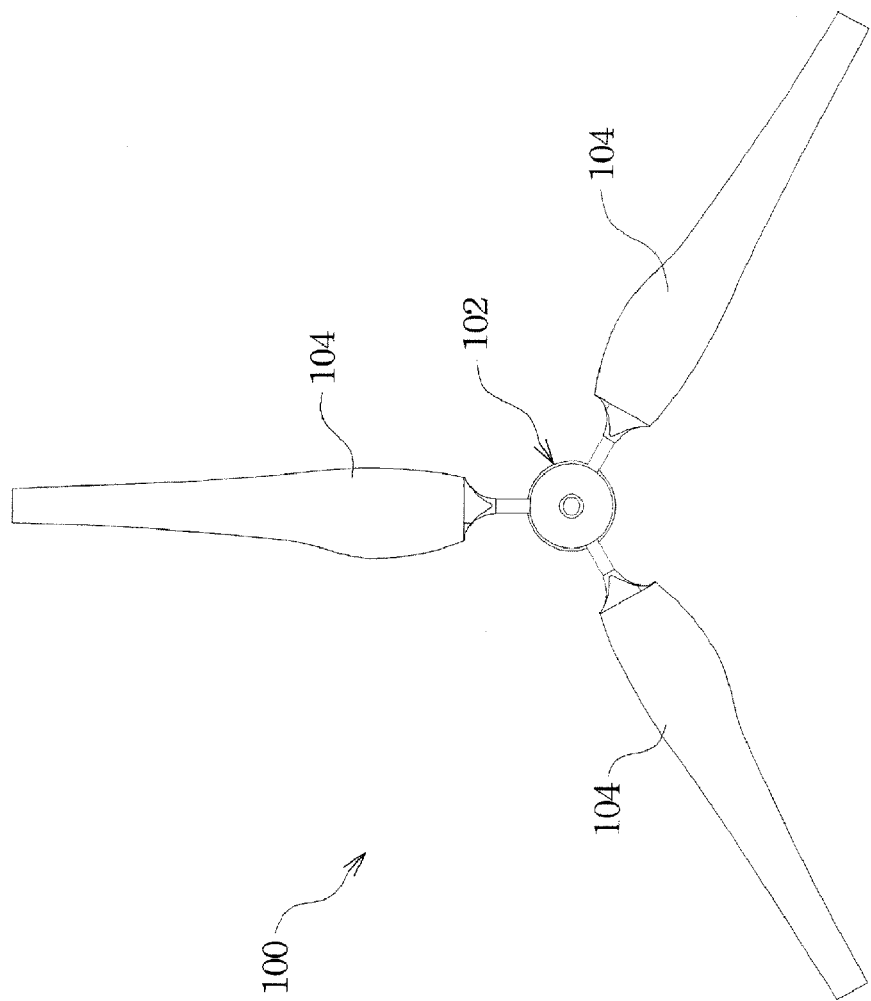
FIG. 1C is a top plan view of the embodiment of the present invention.
Figure 1D:
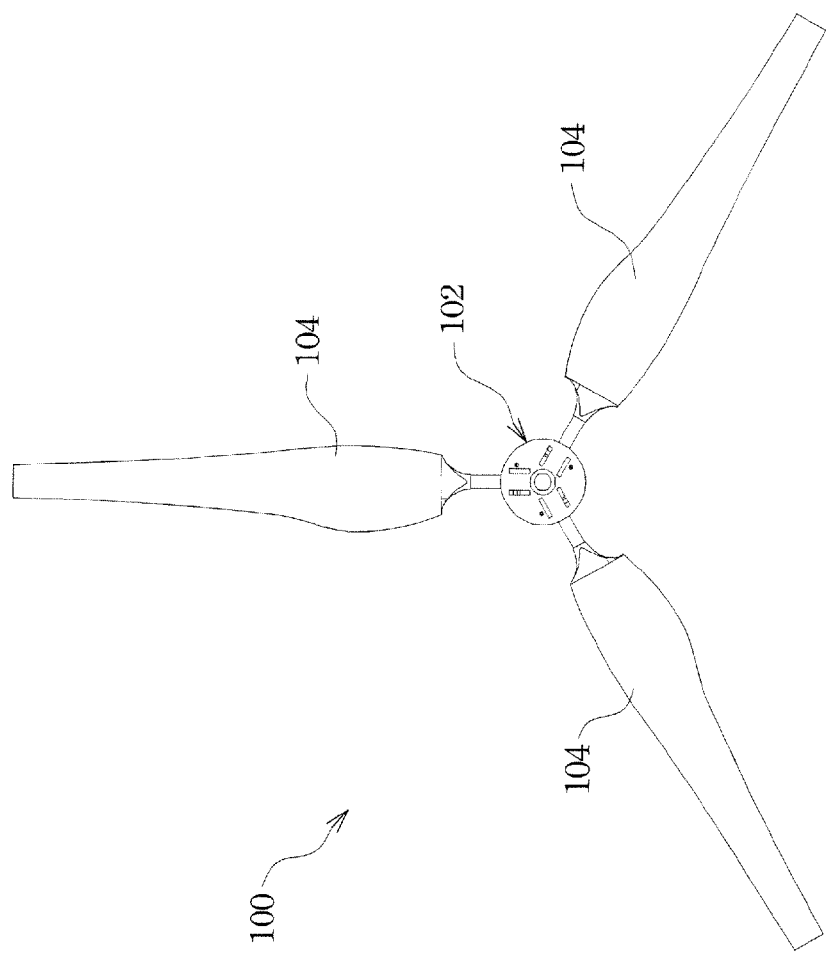
FIG. 1D is a bottom plan view of the embodiment of the present invention.

FIGS. 1A-1D respectively show a perspective view, a side elevational view, a top plan view and a bottom plan view of a wind power generator in accordance with a preferred embodiment of the present invention. In the instant embodiment, the wind power generator, which is broadly designated at 100, comprises a blade pitch controlling apparatus 102 and a plurality of blades 104. As shown in FIG. 1A, three blades 104 are used. As shown in FIGS. 1A, 1B, 1C, and 1D, the blades 104 are mounted to an outer circumference of the blade pitch controlling apparatus 102 in an equally spaced manner.

Figure 2:
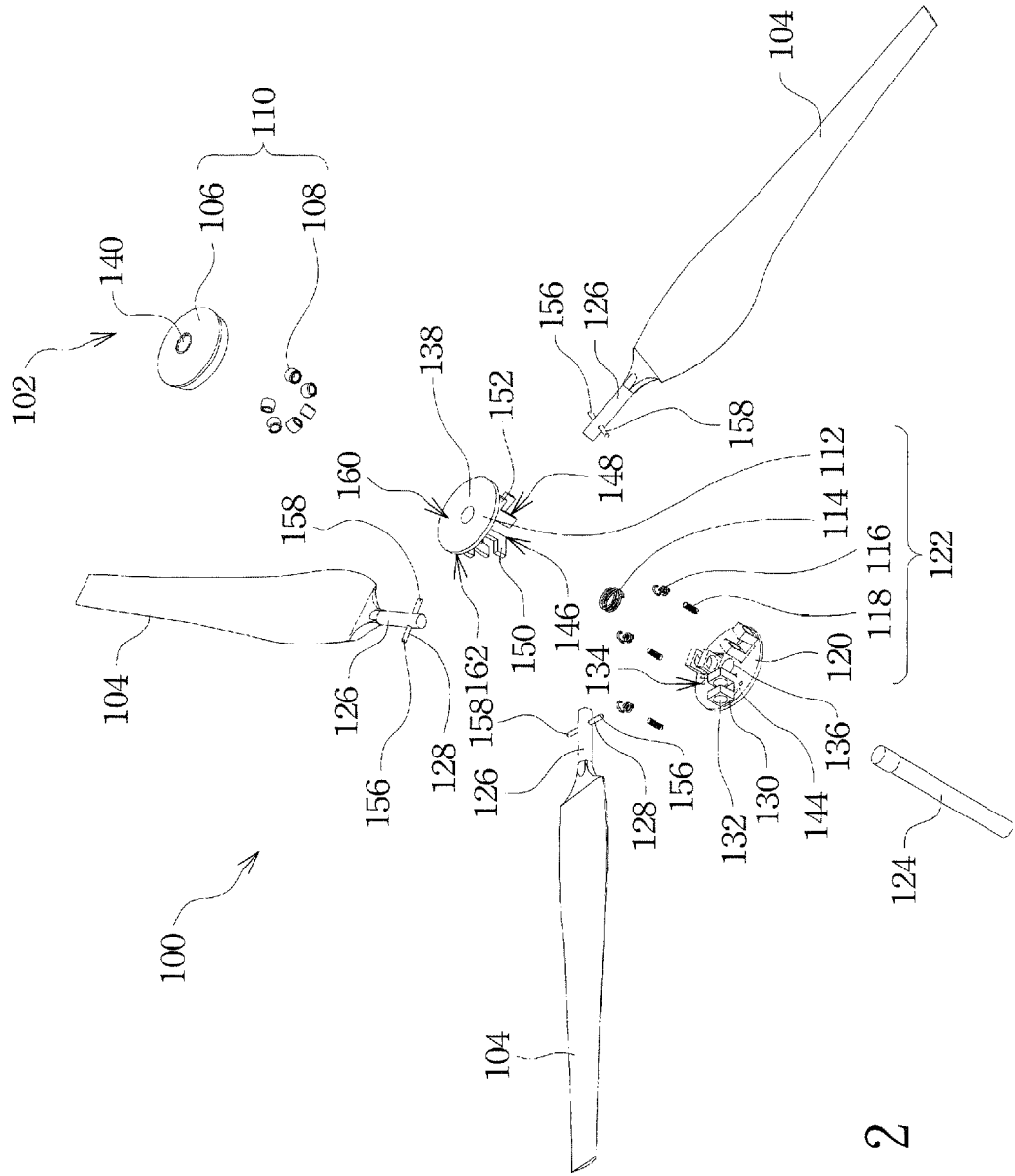
FIG. 2 is an exploded view of the embodiment of the present invention.

Referring to FIG. 2, an exploded view of a wind power generator in accordance with a preferred embodiment is shown. In the instant embodiment, each blade 104 comprises a shaft 126, and each shaft 126 comprises a pin 128 transversely extending therethrough. Each pin 128 has two opposite ends 156, 158, which are respectively located on opposite sides of the shaft 126. The blade pitch controlling apparatus 102 comprises at least a centrifugal device 110 and a blade pitch variable device 122. The blade pitch variable device 122 is arranged under the wind power generator 100.

Figure 3A:
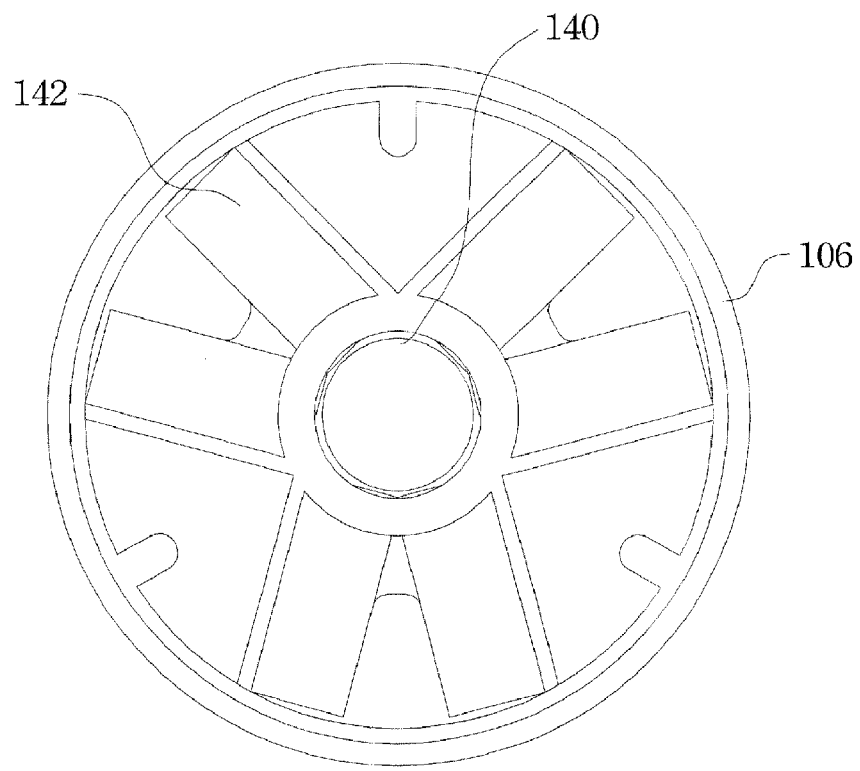
FIG. 3A is a bottom view of a centrifugal disk of a centrifugal device in accordance with an embodiment of the present invention.
Figure 3B:
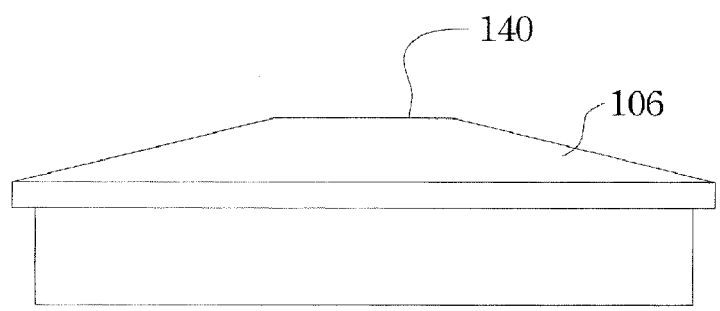
FIG. 3B is a side elevational view of the centrifugal disk of the centrifugal device in accordance with the embodiment of the present invention.

Referring to FIGS. 2, 3A, and 3B, of which FIG. 3A shows a bottom view of a centrifugal disk of the centrifugal device in accordance with a preferred embodiment of the present invention and FIG. 3B shows a side elevational view of the centrifugal disk, as shown in FIG. 2, in the instant illustrative embodiment, the wind power generator 100 comprises a centrifugal disk 106 and a plurality of rollers 108. As shown in FIG. 3A, the centrifugal disk 106 has an inside surface in which a plurality of tracks 142 is defined. These tracks 142 are preferably arranged in a symmetric and concentrically radiating manner. The rollers 108 are respectively and movably received in the tracks 142 of the centrifugal disk 106, so that the rollers 108 are movable along the respective tracks 142. As shown in FIGS. 3A and 3B, these tracks 142 are formed in an incline structure that inclines downward from a center toward an outer circumference. In this way, when the centrifugal device 110 rotates to generate a centrifugal force that causes the rollers 108 to roll outward, the rollers 108 induce a downward pressing force on the blade pitch variable device 122 that is located on the under side. In the instant embodiment, the centrifugal disk 106 can be for example a pulley disk. As shown in FIG. 3A, the centrifugal disk 106 may further define a through hole 140 at a center thereof to facilitate assembling of the whole device.

Figure 4A:
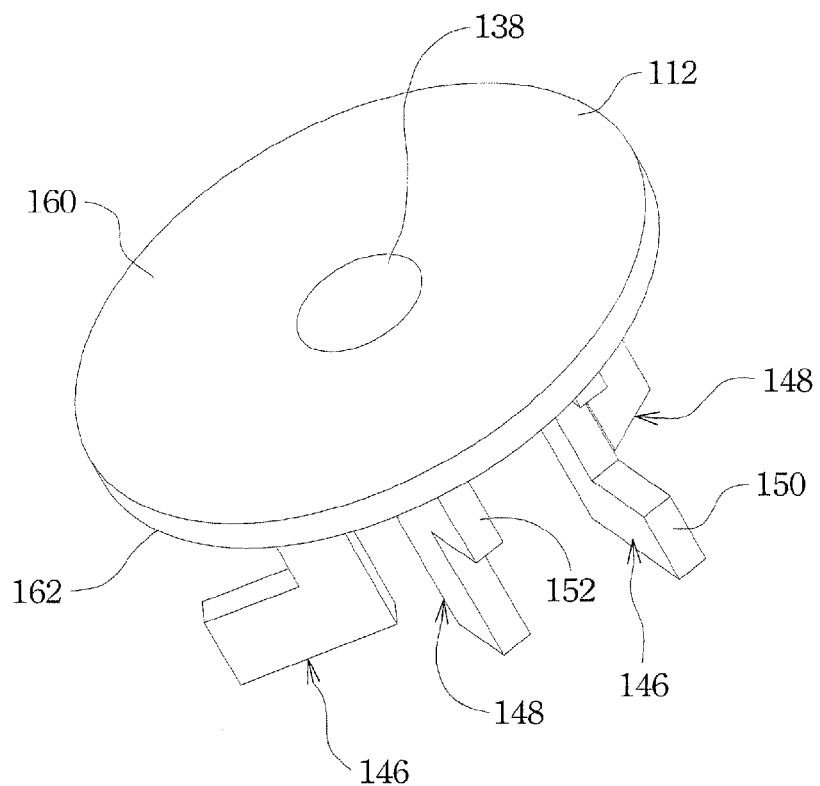
FIG. 4A is a perspective view of a control disk of a blade pitch variable device in accordance with an embodiment of the present invention.
Figure 4B:
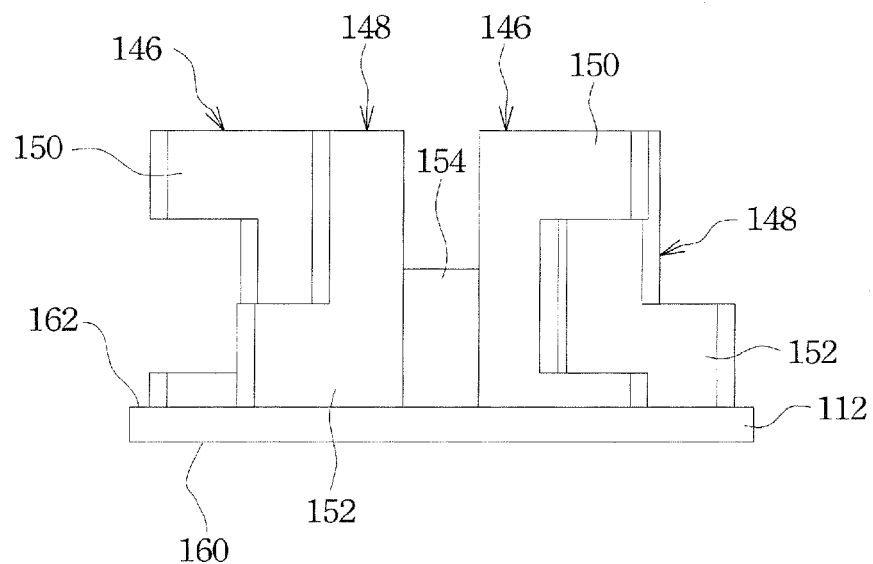
FIG. 4B is a side elevational view of the control disk of the blade pitch variable device in accordance with the embodiment of the present invention, illustrated in an up-side down manner.

As shown in FIG. 2, the blade pitch variable device 122 is arranged under the wind power generator 100. The blade pitch variable device 122 comprises a control disk 112, a setting disk 120, a first spring 114, a plurality of second springs 116, and a plurality of adjustment elements 118. Also referring to FIGS. 4A and 4B, the control disk 112 has opposite surfaces 160, 162 and the control disk 112 forms a plurality of lifting elements 146 and constraining elements 148, which are preferably of the same number as the blades 104. In the instant embodiment, the lifting elements 146 and the constraining elements 148 alternate each other and each of the blades 104 is associated with a lifting element 146 and a constraining element 148, as shown in FIG. 1A. As shown in FIGS. 4A and 4B, each lifting element 146 comprises a lifting section 150 and each constraining element 148 comprises a constraining section 152. In the instant illustrative embodiment, each lifting element 146 assumes a C-shape and each constraining element 148 forms an inverted L-shape, as shown in FIGS. 4A and 4B. The control disk 112 further forms a through hole 138 that extends through both surfaces 160, 162 of the control disk 112 for facilitating assembling of the whole device. As shown in FIG. 4B, the control disk 112 optionally comprises a support section 154, which is formed under the surface 162 of the control disk 112 to allow the first spring 114 to be supported on a bottom thereof (see FIG. 2).

Figure 5A:
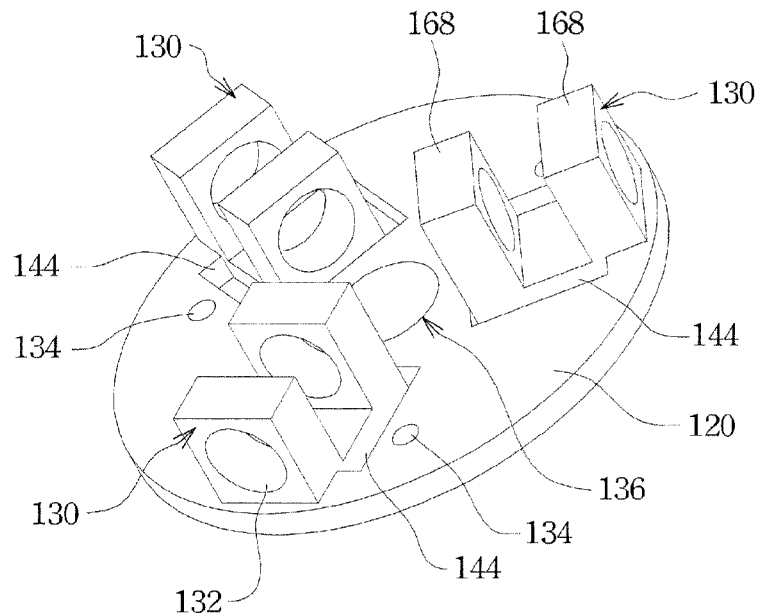
FIG. 5A is a perspective view of a setting disk of a blade pitch variable device in accordance with an embodiment of the present invention.
Figure 5B:
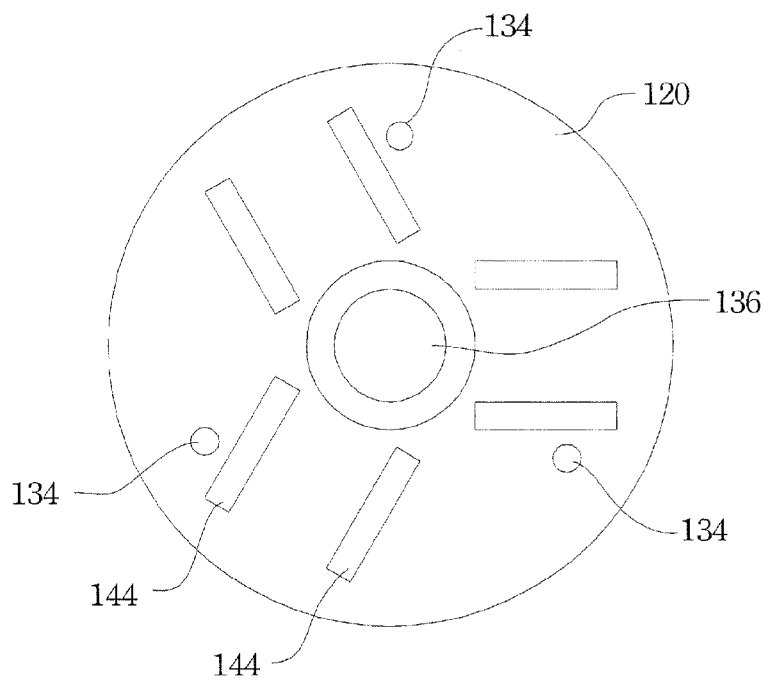
FIG. 5B is a bottom plan view of the setting disk of the blade pitch variable device in accordance with the embodiment of the present invention.

As shown in FIG. 2, the setting disk 120 is arranged below the control disk 112. As shown in FIGS. 5A and 5B, of which FIG. 5A shows a perspective view of a setting disk of a blade pitch variable device of the blade pitch controlling apparatus in accordance with a preferred embodiment of the present invention and FIG. 5B is a bottom plan view of the setting disk, the setting disk 120 comprises a plurality of setting sections 130 of which the number is preferably the same as that of the blades 104 to respectively receive and support the shafts 126 of the blades 104. Also referring to FIG. 1A, in the instant embodiment, the setting disk 120 is set under the control disk 112 with each setting section 130 between adjacent lifting element 146 and constraining element 148. As shown in FIGS. 1A and 5A, in the instant illustrative embodiment, each setting section 130 comprises two stands 168, which are formed on a surface of the setting disk 120 and each defines a through hole 132 to rotatably receive the shaft 126 of the respective blade 104 therein. Further, as shown in FIGS. 5A and 5B, the setting disk 120 forms a plurality of through holes 144 in such a way that each of the through holes 144 is formed in each of two opposite sides of each setting section 130 to respectively receive the lifting element 146 and the constraining element 148 associated with the setting section 130 to extend therethrough in a movable manner. The setting disk 120 further forms a through hole 136 in a central portion thereof and extending through the center of the setting disk 120 for facilitating assembling of the whole device. Further, as shown in FIGS. 2 and 5A, the setting disk 120 optionally forms a plurality of retention holes 134 that respectively receive the adjustment elements 118 (see FIG. 6) therein. The number of the retention holes 134 is preferably the same as that of the blades 104. Preferably, the retention holes 134 are formed in the same sides of the setting sections 130.

Referring to FIGS. 2 and 4B, the first spring 114 is arranged under the surface 162 of the control disk 112 with an end of the first spring 114 supported on the bottom of the support section 154 of the control disk 112. In the blade pitch variable device 122, the first spring 114 is retained between the surface 162 of the control disk 112 and the setting disk 120. With the centrifugal device 110 positioned on the surface 160 of the control disk 112 and the first spring 114 supported on the surface 162 of the control disk 112, the movement of the control disk 112 in the upward-downward direction is subjected to constrain by the centrifugal device 110 on the upper side and the first spring 114 on the lower side.

Figure 6:
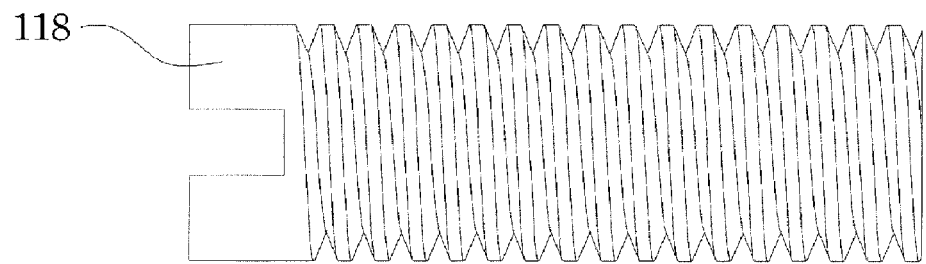
FIG. 6 is a side elevational view of an adjustment element of the blade pitch variable device in accordance with an embodiment of the present invention.
Figure 7:
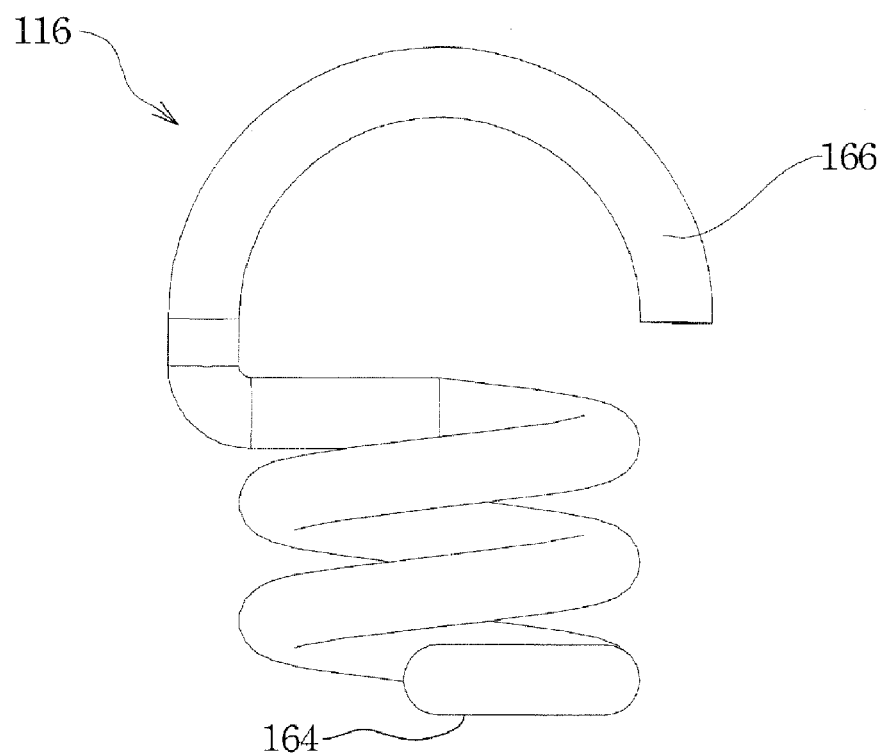
FIG. 7 is a side elevational view of a spring of the blade pitch variable device in accordance with an embodiment of the present invention.

Referring to FIG. 2 again, the number of the adjustment elements 118 is preferably the same as that of the blades 104. An end of each adjustment element 118 is received in and retained by the respective retention hole 134 of the setting disk 120 and an opposite end of the adjustment element 118 projects beyond the setting disk 120 and is located at one side of the respectively setting section 130. As shown in FIG. 6, in the instant illustrative embodiment, the adjustment element 118 comprises a threaded bar. As shown in FIG. 2, the number of the second springs 116 is preferably the same as that of the blades 104. Referring to FIGS. 1A and 2, with the shaft 126 of each blade 104 received in the corresponding setting section 130 of the setting disk 120, the end 158 of the pin 128 of the shaft 126 of the blade 104 is located below the constraining section 152 of the respective constraining element 148, while the other end 156 of the pin 128 is located in the respective lifting element 146, such as being received in the C-shape that defines the lifting element 146, and is located above the lifting section 150. Referring to FIGS. 1A and 7, an end 164 of each second spring 116 is coupled and fixed to the setting disk 120 and an opposite end 166 of the second spring 116 engages and is hooked to the end 156 of the pin 128 of the blade 104. Further, the end of the adjustment element 118 that is located at one side of the setting section 130 is located below the end 156 of the pin 128 and supports the end 156 of the pin 128. In the instant preferred embodiment, the adjustment elements 118 can be respectively encompassed by the second springs 116. As shown in FIG. 1A, with such an arrangement of the adjustment elements 118 and the second springs 116, the pins 128 of the blades 104 can be properly positioned, wherein the combination of the adjustment element 118 and the associated second spring 116 provides a force that normally maintains a fixed setting angle. Further, by adjusting the height of the adjustment elements 118 beyond the setting disk 120, the pins 128 are allowed to rotate to cause rotation of the shafts 126 so as to realize adjustment of the setting angle of the blades 104.

As shown in FIG. 2, in the instant illustrative embodiment, the blade pitch controlling apparatus 102 further comprises a support axle 124 extending through the centrifugal device 110 and the control disk 112, the first spring 114, and the setting disk 120 of the blade pitch variable device 122 to assemble the centrifugal device 110 and the blade pitch variable device 122 together.

Figure 8A:
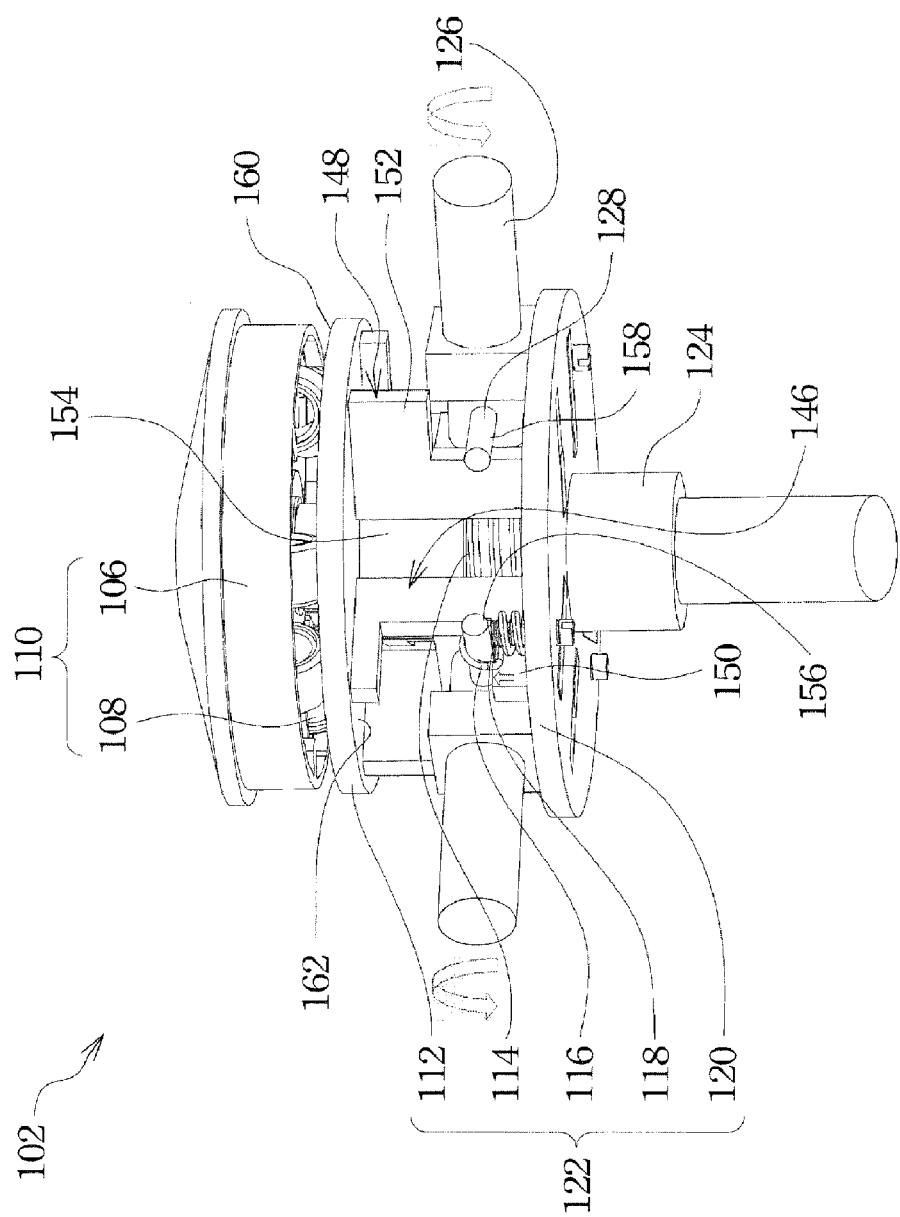
FIG. 8A shows a non-steady-state acceleration condition of a blade pitch controlling apparatus in accordance with an embodiment of the present invention.

As shown in FIG. 8A, which shows a non-steady-state acceleration condition of the blade pitch controlling apparatus of a wind power generator in accordance with a preferred embodiment of the present invention, when the wind power generator 100 shown in FIG. 1 starts to rotate, the rollers 108 of the centrifugal device 110 of the blade pitch controlling apparatus 102 are caused by centrifugal force induced by the rotation to move outward along the tracks 142 of the centrifugal disk 106. At this time, being controlled by the incline structure of the centrifugal disk 106 that inclines downward from the center toward the outer circumference thereof, the rollers 108 are forced to descend to apply a downward pressing force to the surface 160 of the control disk 112 of the blade pitch variable device 122. At the same time, to prevent the rollers 108 from unlimited outward movement, the first spring 114 applies an upward spring force to the surface 162 of the control disk 112 to eventually realize dynamic balance of the blade pitch controlling apparatus 102. The spring force that the first spring 114 applies to the control disk 112 raises the control disk 112 upward and when the control disk 112 is raised to a predetermined height preset for the device, the lifting sections 150 of the lifting elements 146 of the control disk 112 engage and start to lift the ends 156 of the respective pins 128 located thereabove. Thus, the pins 128 are caused to rotate counterclockwise, making the shafts 126 rotating counterclockwise, which in turn drive the blades 104 to rotate a given angle in the counterclockwise direction to thereby change the setting angle of the blades 104. In this way, the blades 104 can be set at the optimum windward attack angle in the non-steady-state acceleration phase and thus the time period of the non-steady-state acceleration phase can be shortened.

Figure 8B:
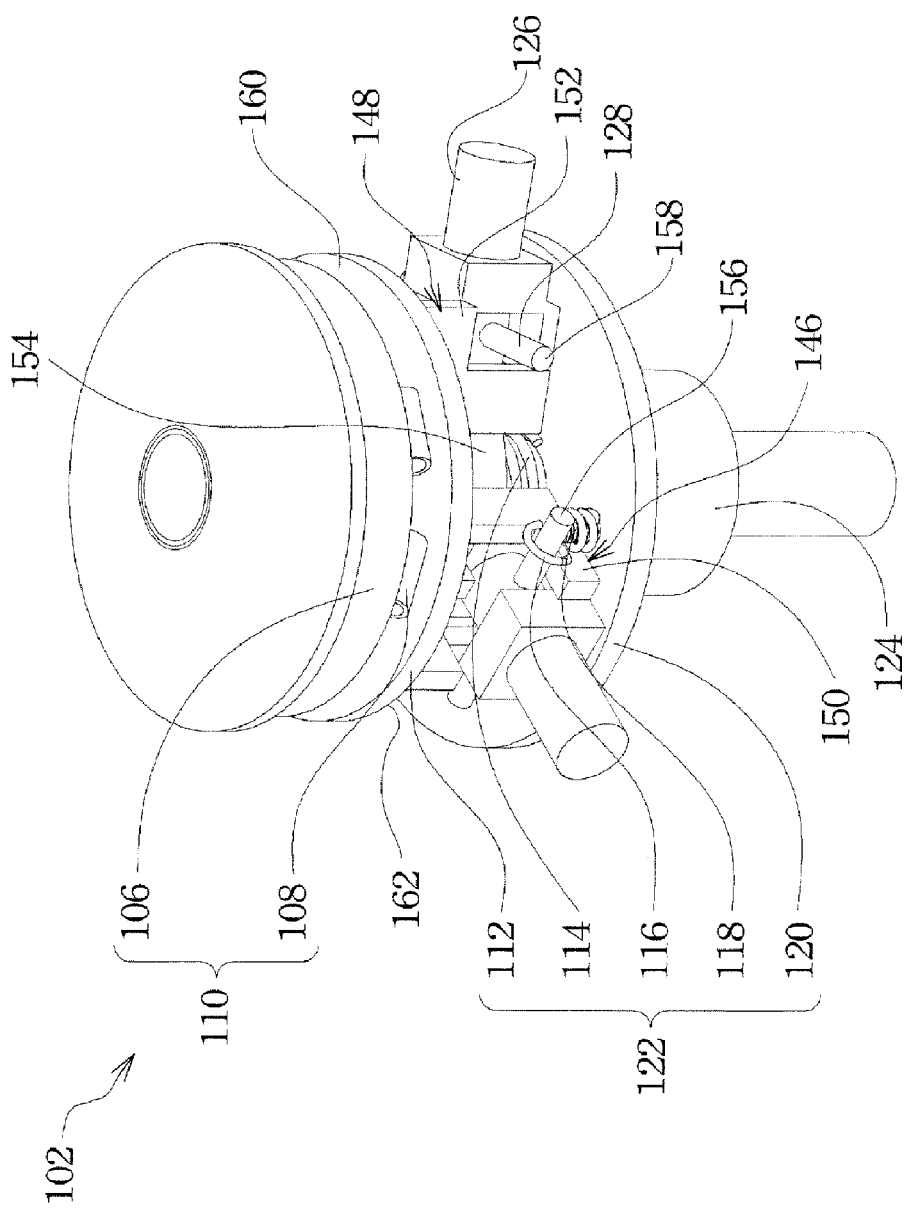
FIG. 8B shows a steady-state operation condition of the blade pitch controlling apparatus in accordance with an embodiment of the present invention.

Referring to FIG. 8B, which shows a steady-state operation condition of the blade pitch controlling apparatus of a wind power generator in accordance with a preferred embodiment of the present invention, in a steady-state operation phase of the wind power generator 100 of FIG. 1A, the control disk 112 of the blade pitch variable device 122 of the blade pitch controlling apparatus 102 is not set in contact engagement with the pins 128 of the blades 104. In other words, the lifting sections 150 of the lifting elements 146 of the control disk 112 are not put into contact with the pins 128. Under this condition, the pins 128 of the blades 104 are positioned by the second springs 116 and the adjustment elements 118, and the blades 104 can be set at the attack angle of the maximum windward lift force for operation in accordance with preset setting angle.

Figure 8C:
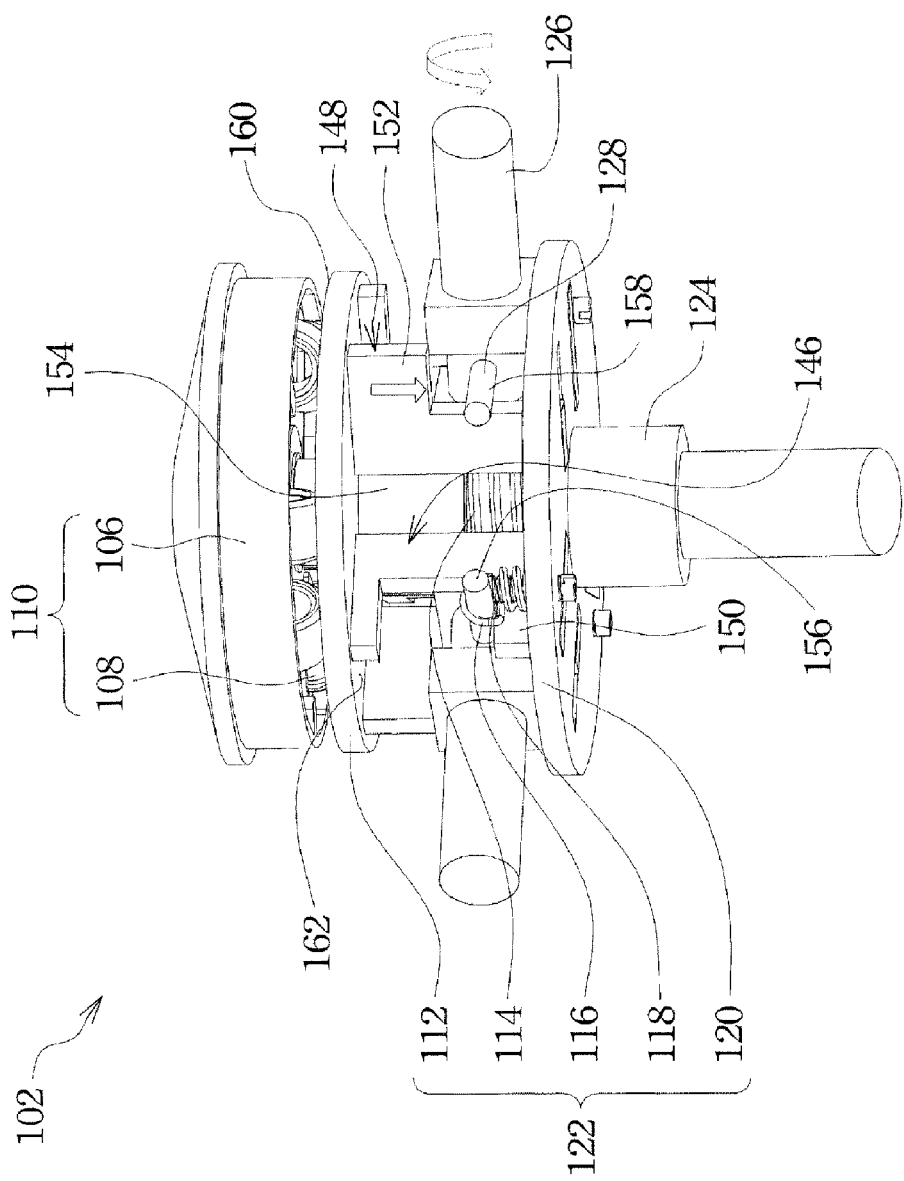
FIG. 8C shows an over-speed protection condition of the blade pitch controlling apparatus in accordance with a preferred embodiment of the present invention.

Referring to FIG. 8C, which shows an over-speed protection condition of the blade pitch controlling apparatus of a wind power generator in accordance with a preferred embodiment of the present invention, when wind speed increasingly raises, although the wind power generator 100 can be maintained in a steady-state operation condition, yet over-speed may cause damage to the blades 104 or the wind power generator 100 itself, and thus reduction of speed is often necessary. When wind power generator 100 is operated in an over-speed condition, an excessive centrifugal force caused by such an over speed of rotation makes the rollers 108 greatly and downward depressing the control disk 112 of the blade pitch variable device 122, leading to a significant downward movement of the control disk 112. When the control disk 112 is lowered to another preset height, the constraining sections 152 of the constraining elements 148 that are arranged under the control disk 112 depress the ends 158 of the pins 128 of the blades 104 downward, causing counterclockwise rotation of the shafts 126 of the blades 104 again, which drive the blades 104 to rotate counterclockwise, eventually leading to a negative attack angle of the blades 104 to cause stalling of the blades 104, thereby realizing protection of the blade 104 and the wind power generator 100.

In the present invention, the weights of the rollers, the spring coefficients of the first spring and the second springs, and the strokes of movement of the two ends of the pins of the shafts of the blades can be adjusted according to the requirements set for various wind power generators to optimize the performance of each wind power generator.

From the above description, it is noted that the advantages of the present invention are that the blade pitch controlling apparatus, as well as the wind power generator that uses the blade pitch controlling apparatus, is provided with a centrifugal device that varies a downward stroke of a blade pitch variable device located therebelow according to the magnitude of an induced centrifugal force so as to change the setting angle of the blades of the wind power generator to thereby maintain the optimum windward attack angle of the blades in a starting course of acceleration, maintain the operation of steady state rotation of the blades at the attack angle that provides the maximum windward lift force, and stall the blades in an over-speed condition for reducing the thrust force of the blades.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A blade pitch controlling apparatus, comprising:
a centrifugal device; and
a blade pitch variable device, which comprises:
a control disk, which comprises a plurality of lifting elements and a plurality of constraining elements, which alternate each other;
a setting disk, which is arranged under the control disk, the setting disk comprising a plurality of setting sections to respectively receive a plurality of blade shafts, each setting section being arranged between adjacent lifting element and constraining element, the setting disk forming a plurality of through holes for respectively receiving extension of the lifting elements and the constraining elements in a movable manner, each of the blade shafts comprising a pin having opposite first and second ends;
a first spring, which is arranged between the control disk and the setting disk, the centrifugal device and the first spring being respectively positioned against opposite surfaces of the control disk;
a plurality of second springs, each of which has a first end coupled to the setting disk and a second end coupled to the first end of each of the pins; and
a plurality of adjustment elements, each of which is set below and in contact engagement with the first end of each of the pins, whereby when the control disk is raised to a first predetermined height, the lifting elements respectively raise the first ends of the pins, and when the control disk is lowered down to a second predetermined height, the constraining elements respectively depress downward the second ends of the pins.

2. The blade pitch controlling apparatus according to claim 1, wherein the centrifugal device comprises:
a centrifugal disk, which defines a plurality of tracks; and
a plurality of rollers, which are respectively and movably received in the tracks, whereby the roller are movable along the respective tracks.

3. The blade pitch controlling apparatus according to claim 1, wherein each of the lifting elements comprises a C-shape, which receives the first end of the respective pin therein.

4. The blade pitch controlling apparatus according to claim 1, wherein each of the constraining elements comprises an inverted L-shape.

5. The blade pitch controlling apparatus according to claim 1, wherein each of the setting sections has two opposite sides in which the through holes are defined.

6. The blade pitch controlling apparatus according to claim 1, wherein each of the adjustment elements comprises a threaded bar.

7. The blade pitch controlling apparatus according to claim 1, wherein the adjustment elements are respectively encompassed by the second springs.

8. The blade pitch controlling apparatus according to claim 1 further comprising a support axle extending through the centrifugal device, the control disk, the first spring, and the setting disk.

9. A wind power generator comprising:
   a plurality of blades, each of which comprises a shaft, each shaft comprising a pin that has opposite first and second ends; and
   a blade pitch controlling apparatus, comprising:
   a centrifugal device; and
   a blade pitch variable device, which comprises:
   a control disk, which comprises a plurality of lifting elements and a plurality of constraining elements, which alternate each other;
   a setting disk, which is arranged under the control disk, the setting disk comprising a plurality of setting sections, the shafts being respectively and rotatably received in the setting sections, each setting section being arranged between adjacent lifting element and constraining element, the setting disk forming a plurality of through holes for respectively receiving extension of the lifting elements and the constraining elements in a movable manner;
   a first spring, which is arranged between the control disk and the setting disk, the centrifugal device and the first spring being respectively positioned against opposite surfaces of the control disk;
   a plurality of second springs, each of which has a first end coupled to the setting disk and a second end coupled to the first end of each of the pins; and
   a plurality of adjustment elements, each of which is set below and in contact engagement with the first end of each of the pins, whereby when the control disk is raised to a first predetermined height, the lifting elements respectively raise the first ends of the pins, and when the control disk is lowered down to a second predetermined height, the constraining elements respectively depress downward the second ends of the pins.

10. The wind power generator according to claim 9, wherein the centrifugal device comprises:
    a centrifugal disk, which defines a plurality of tracks; and
    a plurality of rollers, which are respectively and movably received in the tracks, whereby the roller are movable along the respective tracks.

11. The wind power generator according to claim 9, wherein each of the lifting elements comprises a C-shape, which receives the first end of the respective pin therein.

12. The wind power generator according to claim 9, wherein each of the constraining elements comprises an inverted L-shape.

13. The wind power generator according to claim 9, wherein each of the setting sections has two opposite sides in which the through holes are defined.

14. The wind power generator according to claim 9, wherein each of the adjustment elements comprises a threaded bar.

15. The wind power generator according to claim 9, wherein the adjustment elements are respectively encompassed by the second springs.

16. The wind power generator according to claim 9 further comprising a support axle extending through the centrifugal device, the control disk, the first spring, and the setting disk.

* * * * *